US012725794B2

(12) United States Patent
Lee et al.

(10) Patent No.: US 12,725,794 B2
(45) Date of Patent: Sep. 1, 2026

(54) LITHIUM SECONDARY BATTERY

(71) Applicant: LG Energy Solution, Ltd., Seoul (KR)

(72) Inventors: Jeong Woo Lee, Daejeon (KR); Min Ji Heo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 851 days.

(21) Appl. No.: 17/291,189

(22) PCT Filed: Mar. 5, 2020

(86) PCT No.: PCT/KR2020/003111
§ 371 (c)(1),
(2) Date: Dec. 7, 2021

(87) PCT Pub. No.: WO2020/180125
PCT Pub. Date: Sep. 10, 2020

(65) Prior Publication Data

US 2022/0181615 A1 Jun. 9, 2022

(30) Foreign Application Priority Data

Mar. 7, 2019 (KR) ........................ 10-2019-0026396

(51) Int. Cl.
*H01M 4/525* (2010.01)
*H01M 4/38* (2006.01)
(Continued)

(52) U.S. Cl.
CPC ........... *H01M 4/525* (2013.01); *H01M 4/386* (2013.01); *H01M 4/505* (2013.01); *H01M 4/587* (2013.01);
(Continued)

(58) Field of Classification Search
CPC ...... H01M 4/525; H01M 4/386; H01M 4/505; H01M 4/587; H01M 10/0525;
(Continued)

(56) References Cited

U.S. PATENT DOCUMENTS 6,509,123 B1 * 1/2003 Shibuya ............ H01M 10/0565 429/188
2006/0121356 A1 * 6/2006 Jan .................... H01M 10/0569 429/331
(Continued)

FOREIGN PATENT DOCUMENTS

CN 101803101 A 8/2010
CN 105826600 A 8/2016
(Continued)

OTHER PUBLICATIONS

International Search Report for Application No. PCT/KR2020/03111, dated Jun. 12, 2020, 2 pages.
(Continued)

*Primary Examiner* — Osei K Amponsah
*Assistant Examiner* — Kevin Nguyen
(74) *Attorney, Agent, or Firm* — Lerner David LLP

(57) ABSTRACT

The present disclosure relates to a lithium secondary battery having excellent battery performance at high voltage, and relates to a lithium secondary battery including a positive electrode, which includes a positive electrode active material layer including a lithium nickel cobalt manganese-based oxide having an average particle diameter of primary particles of 3 μm or more and a lithium cobalt-based oxide in a weight ratio of 50:50 to 80:20, a negative electrode, which includes a negative electrode active material layer including a negative electrode active material, and an electrolyte including an organic solvent and a lithium salt, wherein the organic solvent includes propyl propionate and a cyclic carbonate solvent containing ethylene carbonate and propylene carbonate, and the ethylene carbonate is included in an amount of less than 25 wt % in the organic solvent.

12 Claims, 4 Drawing Sheets

(51) Int. Cl.
*H01M 4/505* (2010.01)
*H01M 4/587* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01); *H01M 2004/028* (2013.01)

(58) Field of Classification Search
CPC ..... H01M 2004/021; H01M 2004/027; H01M 2004/02
USPC .......................................................... 429/338
See application file for complete search history.

(56) References Cited

U.S. PATENT DOCUMENTS

2006/0222957 A1* 10/2006 Hara ..................... H01M 4/525 429/231.95
2010/0266905 A1 10/2010 Jeon et al.
2011/0079752 A1 4/2011 Park et al.
2011/0111305 A1* 5/2011 Jeon .................. H01M 10/0567 429/231.95
2014/0050985 A1 2/2014 Lee et al.
2014/0346394 A1 11/2014 Park et al.
2014/0356719 A1 12/2014 Park et al.
2015/0010819 A1 1/2015 Lee et al.
2015/0162598 A1 6/2015 Kim et al.
2015/0311512 A1 10/2015 Paulsen et al.
2015/0318537 A1 11/2015 Nishio et al.
2016/0006031 A1* 1/2016 Kaseda ................. H01M 4/505 429/223
2016/0294008 A1* 10/2016 Yoshida ............ H01M 10/0567
2016/0322668 A1* 11/2016 Yu ..................... H01M 10/0567
2017/0288257 A1 10/2017 Kil et al.
2018/0053967 A1* 2/2018 Koh .................. H01M 10/0569
2018/0219212 A1* 8/2018 Seol ...................... H01M 4/364
2018/0261842 A1* 9/2018 Park ...................... H01M 4/505
2018/0351209 A1 12/2018 Zhan et al.
2020/0099101 A1 3/2020 Li et al.
2021/0043937 A1* 2/2021 Hashimoto ....... H01M 10/0525
2022/0102810 A1* 3/2022 Kim .................... H01M 50/443

FOREIGN PATENT DOCUMENTS

CN 108987680 A 12/2018
CN 109301323 A 2/2019
JP 2004192846 A 7/2004
KR 20060108110 A 10/2006
KR 20090030237 A 3/2009
KR 20100130522 A 12/2010
KR 20140024587 A 3/2014
KR 20150006283 A 1/2015
KR 20150048499 A 5/2015
KR 20150050974 A 5/2015
KR 101540673 B1 7/2015
KR 20150092258 A 8/2015
KR 101565533 B1 11/2015
KR 101633961 B1 6/2016
KR 20160066518 A 6/2016
KR 20170063408 A * 6/2017 ............. C01G 53/50
KR 20170069153 A * 6/2017
KR 20180001989 A 1/2018
KR 20180022247 A 3/2018
WO 2014068931 A1 5/2014

OTHER PUBLICATIONS

Search Report for European Application No. 20765888.1 dated Oct. 28, 2021. 2 pgs.

* cited by examiner

LITHIUM SECONDARY BATTERY

CROSS-REFERENCE TO RELATED APPLICATIONS

The present application is a national phase entry under 35 U.S.C. § 371 of International Application No. PCT/KR2020/003111 filed Mar. 5, 2020, which claims priority to Korean Patent Application No. 10-2019-0026396, filed on Mar. 7, 2019, all of which are incorporated by reference in their entirety herein.

TECHNICAL FIELD

The present disclosure relates to a lithium secondary battery having excellent life characteristics and swelling characteristics at high voltage.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Recently, demand for high-capacity batteries tends to increase more and more, and, accordingly, research and development of lithium secondary batteries operated at a high voltage (for example, 4.3 V or more) capable of increasing battery capacity have been actively conducted.

Various lithium transition metal oxides, such as $LiCoO_2$ and $LiNi_{1-n-m}Co_nMn_mO_2$ (0<n<1, 0<m<1), have been used as positive electrode active materials of the lithium secondary batteries.

$LiNi_{1-n-m}Co_nMn_mO_2$ is advantageous in that it may achieve relatively high capacity characteristics, but, since a side reaction occurs at a high voltage of 4.2 V or more, there is a limitation in that battery performance is rapidly degraded and swelling occurs.

$LiCoO_2$ is advantageous in that it exhibits excellent cycle characteristics even at a high voltage, but, since residual amounts of charge and discharge are low, there is a limitation in that capacity characteristics are poor.

In order to address the above limitations, secondary batteries using a mixture of two or more different lithium transition metal oxides as a positive electrode material have been proposed. However, the secondary batteries using the mixed positive electrode material proposed to date have not exhibited satisfactory performance, because battery performance is rapidly degraded due to a side reaction with an electrolyte solution when high-voltage charge and discharge are repeated, or capacity characteristics are insufficient.

DETAILED DESCRIPTION OF THE PRESENT DISCLOSURE

Technical Problem

An aspect of the present disclosure provides a lithium secondary battery having excellent cycle characteristics and swelling characteristics during a high-voltage operation.

Technical Solution

According to an aspect of the present disclosure, there is provided a lithium secondary battery including: a positive electrode which includes a positive electrode active material layer including a lithium nickel cobalt manganese-based oxide and a lithium cobalt-based oxide in a weight ratio of 50:50 to 80:20; a negative electrode which includes a negative electrode active material layer including a negative electrode active material; and an electrolyte including an organic solvent and a lithium salt, wherein an average particle diameter of primary particles of the lithium nickel cobalt manganese-based oxide is 3 μm or more, and the organic solvent includes propyl propionate and a cyclic carbonate solvent containing ethylene carbonate and propylene carbonate, wherein the ethylene carbonate is included in an amount of less than 25 wt % in the organic solvent.

Advantageous Effects

Since a lithium secondary battery according to the present disclosure has a wide operating voltage range by using a mixture of a lithium nickel cobalt manganese-based oxide and a lithium cobalt-based oxide as a positive electrode active material and includes a large amount of the lithium nickel cobalt manganese-based oxide having excellent capacity characteristics, capacity characteristics are excellent.

Also, in the lithium secondary battery according to the present disclosure, since large particles, in which a primary particle diameter is 3 μm or more, are used as the lithium nickel cobalt manganese-based oxide, a contact area with an electrolyte solution is smaller than that of a conventional lithium nickel cobalt manganese-based oxide, which has been commonly used, to minimize a side reaction with the electrolyte solution, and, accordingly, degradation of capacity and generation of swelling during a high-voltage operation may be effectively suppressed.

Furthermore, since the lithium secondary battery according to the present disclosure includes ethylene carbonate, which is easily decomposed at high temperatures, in a small amount of less than 25 wt % and uses an electrolyte containing an excessive amount of propyl propionate with high high-temperature stability, it exhibits stable high-voltage cycle characteristics even when the amount of the lithium nickel cobalt manganese-based oxide is large.

MODE FOR CARRYING OUT THE PRESENT DISCLOSURE

Figure 1:
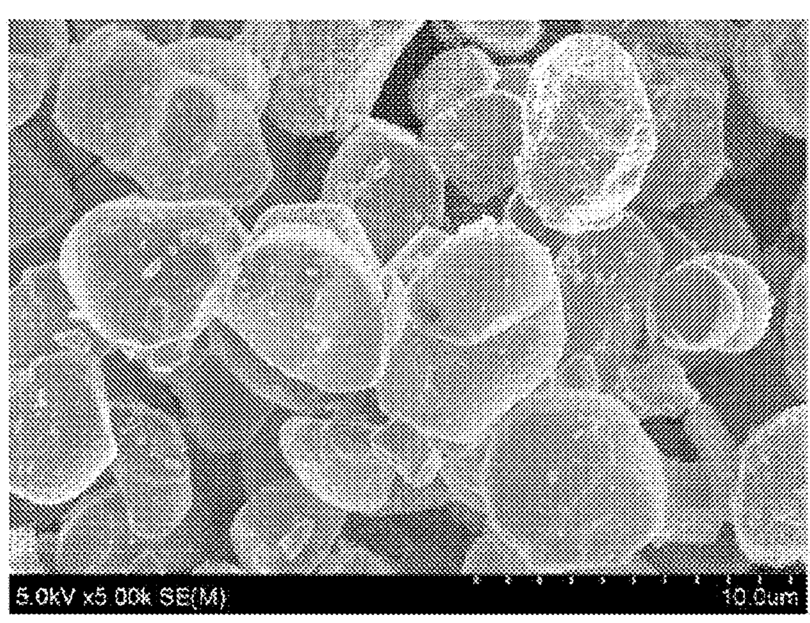
FIG. 1 is a scanning electron microscope (SEM) image of an example of $Li[Ni_{0.5}Co_{0.3}Mn_{0.2}]O_2$ powder prepared by Preparation Example 1.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the present disclosure, based on the principle that an inventor may properly define the meaning of the words or terms to best explain the present disclosure.

The expression "average particle diameter ($D_{50}$)" in the present specification may be defined as a particle diameter at a cumulative volume of 50% in a particle size distribution curve, and the average particle diameter ($D_{50}$) may be measured by using a laser diffraction method. Specifically, after target particles are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at the cumulative volume of 50% may then be calculated by the measurement instrument.

Also, in the present specification, the expression "%" denotes wt % unless otherwise specified.

Hereinafter, the present disclosure will be described in more detail.

A lithium secondary battery of the present disclosure includes a positive electrode including a positive electrode active material layer, a negative electrode including a negative electrode active material layer, and an electrolyte, wherein the positive electrode active material layer includes a lithium nickel cobalt manganese-based oxide having an average particle diameter $D_{50}$ of primary particles of 3 μm or more and a lithium cobalt-based oxide in a weight ratio of 50:50 to 80:20 as a positive electrode active material, a mixed solvent including propyl propionate and a cyclic carbonate solvent containing ethylene carbonate and propylene carbonate is used as an organic solvent of the electrolyte, and the ethylene carbonate is included in an amount of less than 25 wt % in the organic solvent.

With respect to a secondary battery typically using a lithium nickel cobalt manganese-based oxide alone as a positive electrode active material, since a side reaction occurred at a voltage of 4.20 V or more to rapidly degrade battery characteristics, there was a limitation in that operation at a high voltage was not possible. With respect to a secondary battery using a lithium cobalt-based oxide alone as a positive electrode active material, a high-voltage operation was possible, but there was a limitation in that capacity characteristics were poor.

In order to address the above limitations, secondary batteries using a mixture of the lithium nickel cobalt manganese-based oxide and the lithium cobalt-based oxide have been proposed, but these conventional secondary batteries are using powder in the form of a secondary particle, in which a plurality of primary particles having a particle diameter of about 0.1 μm to about 1 μm are aggregated, as the lithium nickel cobalt manganese-based oxide. In a case in which the lithium nickel cobalt manganese-based oxide secondary particle formed by the aggregation of the primary particles having a small average particle diameter as described above is used, since a side reaction with an electrolyte solution severely occurs due to a high specific surface area and a crack phenomenon, in which pores between the primary particles are opened in a charge and discharge process, occurs, cycle characteristics are rapidly degraded at high voltage even if the lithium nickel cobalt manganese-based oxide is used with the lithium cobalt-based oxide, and thus, it is difficult to obtain satisfactory performance at high voltage.

Also, when the lithium nickel cobalt manganese-based oxide and the lithium cobalt-based oxide are mixed and used, an amount of the lithium nickel cobalt manganese-based oxide may be increased to achieve high-capacity characteristics, but, since the lithium nickel cobalt manganese-based oxide has low structural stability at high temperature and high voltage, a problem occurred in which battery performance was rapidly degraded under high temperature and/or high voltage conditions when the amount of the lithium nickel cobalt manganese-based oxide was increased to 50 wt % or more, and, as a result, there was a limitation in improving capacity.

As a result of a significant amount of research conducted to solve the above-described problem and develop a lithium secondary battery having excellent characteristics at a high voltage, the present inventors have found that, when a lithium nickel cobalt manganese-based oxide having an average particle diameter of primary particles of 3 μm or more is used in combination with an electrolyte of a specific composition, stable cycle characteristics and swelling characteristics may be obtained at a high voltage even if an amount of the lithium nickel cobalt manganese-based oxide is increased to 50 wt % or more, thereby leading to the completion of the present disclosure.

Hereinafter, embodiments each component of the lithium secondary battery of the present disclosure will be described in more detail.

Positive Electrode

The positive electrode according to the present disclosure includes a positive electrode active material layer including a mixed positive electrode material composed of two positive electrode active materials with different compositions. Specifically, the positive electrode active material layer according to the present disclosure includes a lithium nickel cobalt manganese-based oxide having a particle diameter of primary particles of 3 μm or more and a lithium cobalt-based oxide.

In one embodiment, the lithium nickel cobalt manganese-based oxide is a lithium composite transition metal oxide containing nickel, cobalt, and manganese as transition metal elements, wherein the lithium nickel cobalt manganese-based oxide, for example, may be represented by Formula 1 below.

$$Li_x[Ni_yCo_zMn_wM^1_v]O_{2-p}A_p \quad \text{[Formula 1]}$$

In [Formula 1], $M^1$ is a doping element substituted for transition metal sites and may include at least one element selected from the group consisting of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo).

A is an element substituted for oxygen sites and may include at least one element selected from the group consisting of fluorine (F), chlorine (Cl), bromine (Br), iodine (I), astatine (At), and sulfur (S).

x represents an atomic ratio of lithium to total transition metals in the lithium nickel cobalt manganese-based oxide, wherein x may be in a range of 1 to 1.30, preferably greater than 1 to 1.30 or less, and more preferably 1.005 to 1.30, for example, 1.01 to 1.20. In a case in which the atomic ratio of the lithium satisfies the above range, a lithium nickel cobalt manganese-based oxide, in which crystallinity is high while an average particle diameter of primary particles is 3 μm or more and cation mixing is low, may be obtained.

y represents an atomic ratio of nickel among the transition metals in the lithium nickel cobalt manganese-based oxide, wherein y is in a range of 0.3 or more to less than 1, for example, 0.5 to 0.95. Since higher capacity may be achieved as an amount of the nickel among the transition metals is increased, that the atomic ratio of the nickel is 0.5 or more is more advantageous for achieving high capacity.

z represents an atomic ratio of cobalt among the transition metals in the lithium nickel cobalt manganese-based oxide, wherein z is in a range of greater than 0 to 0.6 or less, for example, 0.01 to 0.4.

w represents an atomic ratio of manganese among the transition metals in the lithium nickel cobalt manganese-based oxide, wherein w is in a range of greater than 0 to 0.6 or less, for example, 0.01 to 0.4.

v represents an atomic ratio of the doping element $M^1$ doped into the transition metal sites in the lithium nickel cobalt manganese-based oxide, wherein v may be in a range of 0 to 0.2, for example, 0 to 0.1. In a case in which the doping element $M^1$ is added, there is an effect of improving structural stability of the lithium nickel cobalt manganese-based oxide, but, since capacity may be reduced when the amount of the doping element is increased, it is desirable that the doping element is included at an atomic ratio of 0.2 or less.

p represents an atomic ratio of the element A substituted for the oxygen sites, wherein p may be in a range of 0 to 0.2, for example, 0 to 0.1.

In Formula 1, y+z+w+v=1.

The lithium nickel cobalt manganese-based oxide used in the present disclosure has an average particle diameter of the primary particles of 3 μm or more, for example, 3 μm to 10 μm. In a case in which the average particle diameter of the primary particles of the lithium nickel cobalt manganese-based oxide is less than 3 μm, a contact area with an electrolyte solution is increased due to an increase in specific surface area, this causes a limitation in that metal ions are dissolved from the lithium nickel cobalt manganese-based oxide or a side reaction with the electrolyte solution is intensified, and such a phenomenon occurs more significantly when an operating voltage is high. As a result, cycle characteristics are rapidly degraded and swelling occurs under high voltage conditions. In contrast, if particles, in which an average particle diameter of primary particles is 3 μm or more, are used as the lithium nickel cobalt manganese-based oxide, since the contact area with the electrolyte solution is decreased, the side reaction with the electrolyte solution, which causes swelling and battery performance degradation, may not only be minimized, but compression density may also be improved during the preparation of the positive electrode to achieve high energy density.

Also, in the lithium nickel cobalt manganese-based oxide used in the present disclosure, an amount of $Ni^{2+}$ ions occupying lithium sites may be in a range of 5.0 atm % or less, for example, 0.1 atm % to 4.0 atm %. In a case in which the amount of the $Ni^{2+}$ ions occupying the lithium sites satisfies the above range, better electrochemical performance may be achieved.

In a case in which transition metal cations having a size similar to that of a lithium ion ($Li^+$) are present in a lithium transition metal oxide, a phenomenon occurs in which transition metal is incorporated into a lithium layer, wherein this is referred to as cation mixing phenomenon. With respect to the lithium nickel cobalt manganese-based oxide, since a difference in sizes between $Li^+$ and a $Co^{3+}$, $Mn^{4+}$, or $Ni^{3+}$ ion is large, cation mixing is less likely to occur. However, since a $Ni^{2+}$ ion with an oxidation number of +2 among nickel ions has a size similar to that of the lithium ion, cation mixing is likely to occur. Since a layered crystal structure does not develop properly when the $Ni^{2+}$ ions are mixed in the lithium layer, structural stability of the active material is reduced and movement of the lithium ions is prevented by the $Ni^{2+}$ ions present in the lithium layer, and thus, battery performance is degraded. Therefore, in the present disclosure, excellent electrochemical performance was allowed to be realized by using the lithium nickel cobalt manganese-based oxide in which the amount of the $Ni^{2+}$ ions occupying the lithium sites was 5.0 atm % or less.

The lithium nickel cobalt manganese-based oxide may have a monolithic structure composed of the primary particles or may be in the form of a secondary particle in which 30 or less, preferably 10 or less, and more preferably 5 or less of the primary particles are aggregated. In a case in which the lithium nickel cobalt manganese-based oxide having the monolithic structure or a structure, in which a relatively small number of the primary particles are aggregated as described above, is used, a specific surface area may be decreased to minimize the side reaction with the electrolyte solution, and the compression density may be improved to achieve high energy density.

The lithium nickel cobalt manganese-based oxide in the form of a single particle or secondary particle may have an average particle diameter $D_{50}$ of 3 μm to 30 μm, preferably 3 μm to 15 μm, and more preferably 3 μm to 10 μm. In a case in which the average particle diameter $D_{50}$ of the lithium nickel cobalt manganese-based oxide satisfies the above range, high compression density may be achieved when the lithium cobalt-based oxide to be described later is mixed, and, as a result, an effect of improving energy density may be obtained.

The lithium nickel cobalt manganese-based oxide of the present disclosure as described above may be prepared by a method in which a lithium raw material and a transition metal precursor are mixed such that a ratio of the number of lithium atoms to the number of total transition metal atoms is in a range of 1 or more, for example, 1.005 to 1.30, and then heat-treated at a relatively high temperature.

The lithium raw material, for example, may include lithium-containing carbonates (e.g., lithium carbonate, etc.), hydrates (e.g., lithium hydroxide monohydrate ($LiOH \cdot H_2O$), etc.), hydroxides (e.g., lithium hydroxide, etc.), nitrates (e.g., lithium nitrate ($LiNO_3$), etc.), or chlorides (e.g., lithium chloride (LiCl), etc.), but the lithium raw material is not limited thereto.

The transition metal precursor, for example, may include a hydroxide, oxyhydroxide, carbonate, or organic complex of nickel manganese cobalt or may include a hydroxide, oxyhydroxide, carbonate, or organic complex of nickel manganese cobalt containing the doping element $M^1$. For example, the nickel cobalt manganese-based precursor may be $[Ni_yCo_zMn_w](OH)_2$, $[Ni_yCo_zMn_wAl_v](OH)_2$, $[Ni_yCo_zMn_w]O \cdot OH$, or $[Ni_yCo_zMn_wAl_v]O \cdot OH$ (where y, z, w, and v are the same as defined in Formula 1), but the nickel cobalt manganese-based precursor is not limited thereto.

It is desirable that the heat treatment temperature may be a temperature higher than a sintering temperature typically used when a conventional lithium nickel cobalt manganese-based oxide having the same transition metal ratio is prepared, for example, a temperature that is 100° C. or more higher than the sintering temperature typically used. For example, the heat treatment temperature may be in a range of 850° C. to 1,100° C., for example, 950° C. to 1,050° C.

In general, a lithium nickel cobalt manganese-based oxide has an appropriate sintering temperature depending on a composition of transition metals. For example, in a case in which an atomic ratio of nickel:cobalt:manganese is 5:3:2, it is known that the appropriate sintering temperature is in a range of 750° C. to 850° C., and, in a case in which the atomic ratio of nickel:cobalt:manganese is 8:1:1, it is known that the appropriate sintering temperature is in a range of 700° C. to 800° C.

In a case in which sintering is performed at a temperature lower than the appropriate sintering temperature, the electrochemical performance may be degraded due to insufficient crystal growth, and, if the sintering temperature is excessively higher than the appropriate sintering temperature, a cation mixing or oxygen desorption phenomenon may occur to reduce the structural stability.

In a case in which the conventional appropriate sintering temperature is used, the particle diameter of the primary particles of the lithium nickel cobalt manganese-based oxide is formed to be less than 3 μm (typically 0.1 μm to 1 μm level). The particle diameter of the primary particles may be formed to be large when the sintering temperature is increased, but, in a case in which only the sintering temperature is increased without changing other conditions, oxygen desorption occurs, a large amount of relatively more stable $Ni^{2+}$ ions than $Ni^{3+}$ ions is generated to maintain an electrical equilibrium state when the oxygen desorption occurs, and, as a result, the cation mixing phenomenon is intensified and the crystallinity is reduced to significantly degrade the electrochemical performance.

However, in a case in which the sintering is performed at a relatively high temperature after the lithium raw material and the transition metal precursor are mixed such that the ratio of the number of lithium atoms to the number of total transition metal atoms is in a range of 1 or more, for example, 1.005 to 1.30 as in the present disclosure, a lithium nickel cobalt manganese-based oxide, in which the cation mixing is low while the average particle diameter of the primary particles is 3 μm or more and the crystallinity is excellent, may be obtained. When there are many lithium ions in reactants, a ratio of the lithium ions occupying the lithium sites increases stochastically, and the oxidation number of the transition metal is increased to convert $Ni^{2+}$ ions to $Ni^{3+}$ ions. Also, when the oxidation number of the transition metal element is increased, a binding energy between a transition metal ion and an oxygen ion increases to reduce a transition metal layer spacing, and as a result, an interlayer spacing between the lithium layer and a transition metal layer may be increased to suppress the incorporation of the transition metal into the lithium layer. Thus, a lithium nickel cobalt manganese-based oxide, in which the cation mixing is low while the average particle diameter of the primary particles is large at 3 μm or more and the crystallinity is excellent, may be prepared by the above-described method.

Next, in one embodiment, the lithium cobalt-based oxide is a lithium transition metal oxide containing cobalt as a transition metal element, wherein the lithium cobalt-based oxide, for example, may be represented by Formula 2 below.

$$LiCo_{1-a}M^2_aO_{2-b}B_b \quad \text{[Formula 2]}$$

In Formula 2, $M^2$ is a doping element substituted for cobalt sites and may include at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo.

B is an element substituted for oxygen sites and may include at least one element selected from the group consisting of F, Cl, Br, I, At, and S.

a represents an atomic ratio of the doping element $M^2$ substituted for the cobalt sites, wherein a may be in a range of 0 to 0.2, for example, 0 to 0.1.

b represents an atomic ratio of the element B substituted for the oxygen sites, wherein b may be in a range of 0 to 0.2, for example, 0 to 0.1.

In general, a lithium cobalt-based oxide has better life characteristics and swelling characteristics at high voltage than the lithium nickel cobalt manganese-based oxide, such as that of [Formula 1]. In a case in which the lithium cobalt-based oxide is mixed and used with the lithium nickel cobalt manganese-based oxide, the mixture may be stably operated even at a high voltage similar to the lithium cobalt-based oxide.

Although the lithium cobalt-based oxide used in the present disclosure is not limited thereto, the lithium cobalt-based oxide may have an average particle diameter $D_{50}$ of 10 μm to 20 μm, for example, 12 μm to 20 μm. In a case in which the average particle diameter $D_{50}$ of the lithium cobalt-based oxide satisfies the above range, the lithium cobalt-based oxide may be mixed with lithium nickel cobalt manganese-based oxide particles having a relatively smaller size to achieve high compression density, and, as a result, an effect of improving the energy density may be obtained.

In the present disclosure, the lithium nickel cobalt manganese-based oxide and the lithium cobalt-based oxide are included in a weight ratio of 50:50 to 80:20, for example, 60:40 to 80:20 in the positive electrode active material layer. Since the lithium nickel cobalt manganese-based oxide has better capacity characteristics than the lithium cobalt-based oxide, capacity characteristics of the battery may be significantly improved when the lithium nickel cobalt manganese-based oxide is included in an amount of 50% or more as described above.

A total weight of the lithium nickel cobalt manganese-based oxide and the lithium cobalt-based oxide may be in a range of 80 wt % to 98 wt %, for example, 85 wt % to 98 wt % based on a total weight of the positive electrode active material layer. When the positive electrode active material is included in an amount within the above range, excellent capacity characteristics may be exhibited.

The positive electrode active material layer may further include a conductive agent and a binder, if necessary.

The conductive agent is used to provide conductivity to the electrode, wherein any conductive agent may be used without particular limitation as long as it has suitable electron conductivity without causing adverse chemical changes in the battery.

Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used.

The conductive agent may be included in an amount of 1.5 wt % or more, preferably 1.5 wt % to 5 wt %, and more preferably 1.5 wt % to 3 wt % based on the total weight of the positive electrode active material layer. If the amount of the conductive agent is less than 1.5 wt % in the positive electrode in which the lithium nickel cobalt manganese-based oxide and the lithium cobalt-based oxide are mixed and used as in the present disclosure, output may be reduced.

Next, the binder improves the adhesion between the positive electrode active material particles and the adhesion between the positive electrode active material and a current collector.

Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode of the present disclosure may be prepared according to a typical method of preparing a positive electrode except that a specific positive electrode active material according to the present disclosure is used. Specifically, a positive electrode material mixture, which is prepared by dissolving or dispersing the positive electrode active material, the binder, and/or the conductive agent in a solvent, is coated on the positive electrode collector, and the positive electrode may then be prepared by drying and rolling the coated positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode material. The positive electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the positive electrode material mixture may be adjusted to have an appropriate viscosity in consideration of a coating thickness of the positive electrode material mixture, manufacturing yield, and workability, and is not particularly limited.

Also, as another method, the positive electrode may be prepared by casting the positive electrode material mixture on a separate support and then laminating a film separated from the support on the positive electrode collector.

Negative Electrode

Next, embodiments of a negative electrode will be described.

One embodiment of the negative electrode according to the present disclosure includes a negative electrode active material layer including a negative electrode active material.

The negative electrode active material may include at least one of a carbon-based negative electrode active material or a silicon-based negative electrode active material.

As the carbon-based negative electrode active material, various carbon-based negative electrode active materials used in the art, for example, irregular, planar, flaky, spherical, or fibrous natural graphite or artificial graphite, Kish graphite, pyrolytic carbon, mesophase pitch based carbon fiber, meso-carbon microbeads, mesophase pitches, high-temperature sintered carbon such as petroleum or coal tar pitch derived cokes, soft carbon, and hard carbon may be used.

For example, the carbon-based negative electrode active material may include at least one of natural graphite or artificial graphite. Further, the carbon-based negative electrode active material may include natural graphite and artificial graphite. In a case in which the natural graphite and the artificial graphite are used together, adhesion with a current collector may be increased to suppress exfoliation of the active material.

The silicon-based negative electrode active material may include at least one selected from the group consisting of metallic silicon (Si), silicon oxide ($SiO_x$, where $0<x<2$), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, Ca, Sr, barium (Ba), radium (Ra), Sc, Y, Ti, Zr, hafnium (Hf), rutherfordium (Rf), V, Nb, Ta, dubidium (Db), Cr, Mo, W, seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, tin (Sn), In, germanium (Ge), phosphorus (P), arsenic (As), antimony (Sb), bismuth (Bi), S, selenium (Se), tellurium (Te), polonium (Po), and a combination thereof.

Since the silicon-based negative electrode active material has higher capacity characteristics than the carbon-based negative electrode active material, better capacity characteristics may be obtained when the silicon-based negative electrode active material is included.

According to an embodiment, the negative electrode active material may be a mixture of the silicon-based negative electrode active material and the carbon-based negative electrode active material, and, in this case, a mixing ratio of the silicon-based negative electrode active material: the carbon-based negative electrode active material may be in a range of 1:99 to 50:50, for example, 5:95 to 30:70, as a weight ratio. In a case in which the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

The negative electrode active material layer may further include a binder and a conductive agent in addition to the negative electrode active material.

The binder is a component that assists in the binding between the conductive agent, the active material, and the current collector, wherein the binder is commonly added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a nitrile-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The negative electrode active material layer may be prepared by coating the negative electrode collector with a negative electrode material mixture, which is prepared by dissolving or dispersing the negative electrode active material as well as selectively the binder and the conductive agent in a solvent, and drying the coated negative electrode collector, or may be prepared by casting the negative electrode material mixture on a separate support and then laminating a film separated from the support on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. The negative electrode collector may typically have a thickness of 3 μm to 500 μm, and, similar to the positive electrode collector, microscopic irregularities may be formed on the surface of the collector to improve the adhesion of the negative electrode active material. The negative electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the negative electrode material mixture may be adjusted to have an appropriate viscosity in consideration of a coating thickness of the negative electrode material mixture, manufacturing yield, and workability, and is not particularly limited.

Electrolyte

Next, various embodiments of an electrolyte will be described.

In one embodiment, the electrolyte used in the present disclosure includes an organic solvent and a lithium salt.

The organic solvent includes a cyclic carbonate solvent and propyl propionate, and the cyclic carbonate solvent includes ethylene carbonate and propylene carbonate.

According to studies performed by the present inventors, in a secondary battery using a mixed positive electrode material of lithium nickel cobalt manganese-based oxide and lithium cobalt-based oxide, in a case in which a combination of the above specific three compounds, that is, ethylene carbonate, propylene carbonate, and propyl propionate is used as an electrolyte organic solvent, it has been found that excellent cycle characteristics and swelling characteristics may be obtained in comparison to a case of using other types of organic solvents.

Continuing with this embodiment, the electrolyte of the present disclosure is characterized in that it includes the ethylene carbonate in an amount of less than 25 wt %, preferably 10 wt % to less than 25 wt %, and more preferably 10 wt % to 23 wt % in the organic solvent.

According to studies performed by the present inventors, it was found that the amount of the ethylene carbonate in the electrolyte was closely related to performance degradation at high voltage. Specifically, in a case in which the amount of the lithium nickel cobalt manganese-based oxide is 50 wt % or more in the total positive electrode active material, it has been found that the cycle characteristics and the swelling characteristics are rapidly degraded at high voltage when the amount of the ethylene carbonate in the organic solvent is 25 wt % or more. The reason for this is considered that the ethylene carbonate is easily decomposed at high temperature and high voltage.

Continuing with this embodiment of the electrolyte of the present disclosure, the propyl propionate may be included in an amount of 50 wt % or more, for example, 50 wt % to 75 wt % based on a total weight of the organic solvent. Since the propyl propionate is not easily decomposed at high voltage, gas generation and battery performance degradation due to electrolyte solution decomposition may be effectively suppressed when the propyl propionate is included in an amount of 50 wt % or more.

Also, the cyclic carbonate solvent may be included in an amount of 40 wt % or less, preferably 30 wt % to 40 wt %, and more preferably 30 wt % to 35 wt % based on the total weight of the organic solvent. When the amount of the cyclic carbonate solvent satisfies the above range, excellent performance characteristics may be achieved at high voltage while the electrolyte solution maintains appropriate viscosity.

The cyclic carbonate solvent may include the ethylene carbonate and the propylene carbonate in a weight ratio of 1.5:1 to 3:1, for example, 1.5:1 to 2.5:1. In a case in which the amount of the ethylene carbonate is greater than the above range, high-voltage cycle characteristics and swelling characteristics may be degraded, and, in a case in which the amount of the ethylene carbonate is less than the above range, since the viscosity of the electrolyte solution is increased, mobility of lithium ions may be reduced.

In addition to the above components, the organic solvent may further include a linear carbonate, such as dimethyl carbonate (DMC), diethyl carbonate (DEC), and ethylmethyl carbonate (EMC), if necessary. In a case in which the linear carbonate having low viscosity characteristics is included, since the viscosity of the electrolyte solution is reduced, an effect of improving the mobility of the lithium ions may be obtained.

Next, any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof.

The lithium salt may be appropriately changed in a normally usable range, but may specifically be included in a concentration of 0.8 M to 3 M, for example, 0.1 M to 2.5 M in the electrolyte solution.

In order to improve lifetime characteristics of the battery, suppress the reduction in battery capacity, and improve discharge capacity of the battery, various additives may be included in the electrolyte in addition to the above components. The additive, for example, may include a haloalkylene carbonate-based compound such as fluoroethylene carbonate; pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and these additives may be used alone or in a mixture thereof. In this case, the additive may be included in an amount of 0.1 wt % to 5 wt % based on a total weight of the electrolyte.

Separator

In some embodiments, the lithium secondary battery according to the present disclosure may include a separator, if desired or necessary.

The separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Since the lithium secondary battery according to the present disclosure as described above has excellent stability and electrochemical performance even at a high voltage, an operating voltage may be 4.35 V or more, and, in a case in which the lithium secondary battery is operated at such high voltage, excellent high-capacity characteristics may be achieved in comparison to a conventional lithium secondary battery.

The lithium secondary battery according to the present disclosure as described above may be suitably used in portable devices, such as mobile phones, notebook computers, and digital cameras, and electric cars such as hybrid electric vehicles (HEVs).

Thus, according to another embodiment of the present disclosure, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present disclosure is not particularly limited, but a cylindrical type using a can, a prismatic type, a pouch type, or a coin type may be used.

The lithium secondary battery according to the present disclosure may not only be used in a battery cell that is used as a power source of a small device, but may also be used as a unit cell in a medium and large sized battery module including a plurality of battery cells.

Hereinafter, certain examples of the present disclosure will be described in detail. The present disclosure may, however, be embodied in many different forms and should not be construed as being limited to the embodiments set forth herein.

Preparation Example 1

Lithium raw material LiOH and nickel cobalt manganese precursor $Ni_{0.5}Co_{0.3}Mn_{0.2}(OH)_2$ were mixed such that an atomic ratio of Li:transition metal was 1.05:1.00, and then heat-treated at 1,000° C. for 10 hours to prepare $Li[Ni_{0.5}Co_{0.3}Mn_{0.2}]O_2$ powder having an average particle diameter $D_{50}$ of primary particles of 5 μm.

FIG. 1 illustrates a scanning electron microscope (SEM) image of a shape of the $Li[Ni_{0.5}Co_{0.3}Mn_{0.2}]O_2$ powder prepared as described above. As illustrated in FIG. 1, it was shown that single particles in the form of primary particles and secondary particles, in which the number of the primary particles aggregated was 10 or less, were mixed in the $Li[Ni_{0.5}Co_{0.3}Mn_{0.2}]O_2$ powder, and an average particle diameter $D_{50}$ of the $Li[Ni_{0.5}Co_{0.3}Mn_{0.2}]O_2$ powder was 7 μm.

Preparation Example 2

$Li[Ni_{0.5}Co_{0.3}Mn_{0.2}]O_2$ powder was prepared in the same manner as in Preparation Example 1 except that a heat treatment was performed at 800° C.

Figure 2:
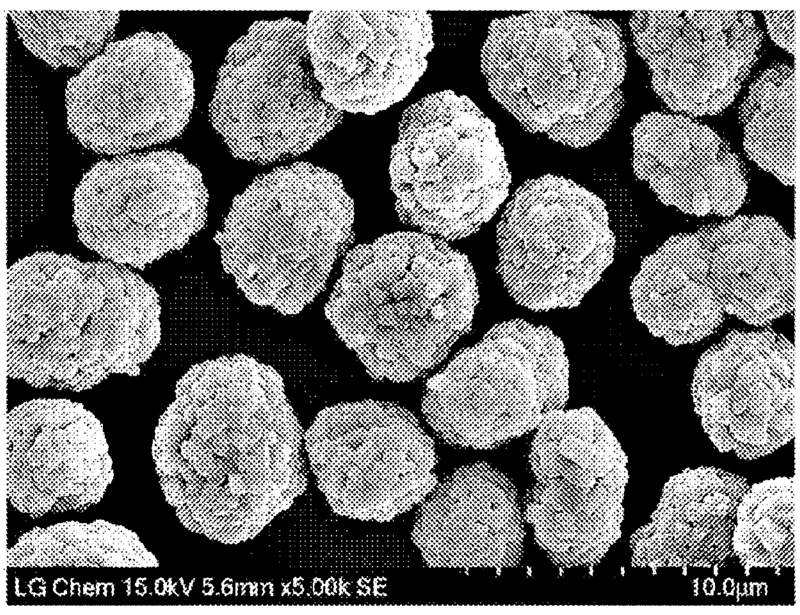
FIG. 2 is an SEM image of an example of $Li[Ni_{0.5}Co_{0.3}Mn_{0.2}]O_2$ powder prepared by Preparation Example 2.

FIG. 2 illustrates an SEM image of a shape of the $Li[Ni_{0.5}Co_{0.3}Mn_{0.2}]O_2$ powder prepared as described above. As illustrated in FIG. 2, the prepared $Li[Ni_{0.5}Co_{0.3}Mn_{0.2}]O_2$ powder was in the form of a secondary particle in which a few tens of primary particles having a particle diameter of 1 μm or less were aggregated, and an average particle diameter $D_{50}$ of the secondary particle was 6 μm.

Example 1

A positive electrode active material, a conductive agent, and a binder were mixed in an N-methylpyrrolidone solvent at a weight ratio of 96.9:1.7:1.4 to prepare a positive electrode material mixture.

In this case, the lithium nickel cobalt manganese-based oxide prepared by Preparation Example 1 and $LiCoO_2$ having an average particle diameter $D_{50}$ of 16 μm were mixed in a weight ratio of 70:30 and used as the positive electrode active material.

Li435 by Denka Company Limited was used as the conductive agent, and KF9700 by Zeon Corporation was used as the binder.

A 10 μm thick aluminum current collector (Sam-A Aluminum) was coated with the positive electrode material mixture prepared, dried at 100° C., and then rolled to prepare a positive electrode.

Next, a negative electrode active material, a binder/thickener, and a conductive agent were mixed in an N-methylpyrrolidone solvent at a weight ratio of 95.8:3.7:0.5 to prepare a negative electrode material mixture. In this case, artificial graphite (Shanshan Technology, QCGX) was used as the negative electrode active material, Li435 by Denka Company Limited was used as the conductive agent, and BML302 by Zeon Corporation was used as the binder.

An 8 μm thick copper current collector (LS Mtron Ltd.) was coated with the negative electrode material mixture prepared, dried at 130° C., and then rolled to prepare a negative electrode.

A separator was disposed between the positive electrode and negative electrode prepared as described above and an electrolyte solution was injected to prepare a lithium secondary battery. An organic solvent, in which ethylene carbonate, propylene carbonate, and propyl propionate were mixed in a weight ratio of 20:10:70, was used as an electrolyte solution organic solvent, and 1.4 M $LiPF_6$ was used as a lithium salt.

Example 2

A lithium secondary battery was prepared in the same manner as in Example 1 except that an organic solvent, in which ethylene carbonate, propylene carbonate, diethyl carbonate, and propyl propionate were mixed in a weight ratio of 20:10:20:50, was used as an electrolyte solution organic solvent.

Example 3

A lithium secondary battery was prepared in the same manner as in Example 1 except that an organic solvent, in which ethylene carbonate, propylene carbonate, diethyl carbonate, and propyl propionate were mixed in a weight ratio of 20:10:40:30, was used as an electrolyte solution organic solvent.

Comparative Example 1

A lithium secondary battery was prepared in the same manner as in Example 1 except that an organic solvent, in which ethylene carbonate, propylene carbonate, and diethyl carbonate were mixed in a weight ratio of 20:10:70, was used as an electrolyte solution organic solvent.

Comparative Example 2

A lithium secondary battery was prepared in the same manner as in Example 1 except that an organic solvent, in which ethylene carbonate, propylene carbonate, diethyl carbonate, and ethylmethyl carbonate were mixed in a weight ratio of 20:10:40:30, was used as an electrolyte solution organic solvent.

Comparative Example 3

A lithium secondary battery was prepared in the same manner as in Example 1 except that an organic solvent, in which ethylene carbonate, propylene carbonate, and propyl propionate were mixed in a weight ratio of 25:10:65, was used as an electrolyte solution organic solvent.

Comparative Example 4

A lithium secondary battery was prepared in the same manner as in Example 1 except that the lithium nickel cobalt manganese-based oxide prepared by Preparation Example 2 and $LiCoO_2$ were mixed in a weight ratio of 70:30 and used as a positive electrode active material.

Experimental Example

High-voltage life characteristics and swelling characteristics of the lithium secondary batteries prepared in Examples 1 to 3 and Comparative Examples 1 to 4 were evaluated.

Specifically, each of the lithium secondary batteries prepared in Examples 1 to 3 and Comparative Examples 1 to 4 was charged at 1.0 C to 4.35 V (0.05 C cut off) under a constant current/constant voltage (CC/CV) condition at 23° C. Subsequently, each lithium secondary battery was discharged at a constant current (CC) of 0.5 C to 3.0 V.

The above charge and discharge behavior was set as one cycle, and capacity retention and swelling characteristics were measured while this cycle was repeated 800 times.

Figure 3:
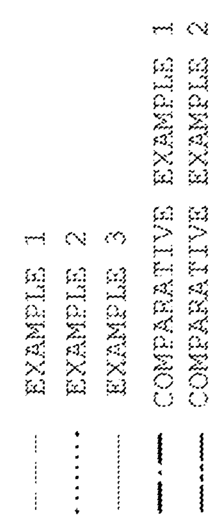
FIG. 3 is a graph comparing capacity retentions and swelling characteristics of secondary batteries prepared by Examples 1 to 3 and Comparative Examples 1 and 2.
Figure 3:
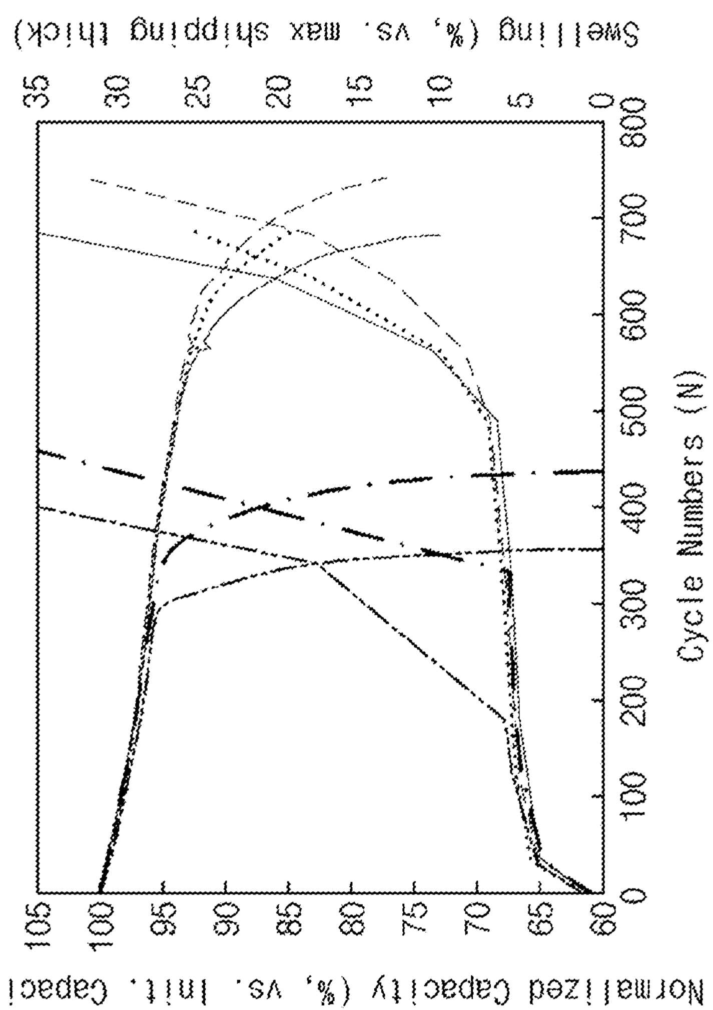
Figure 4:
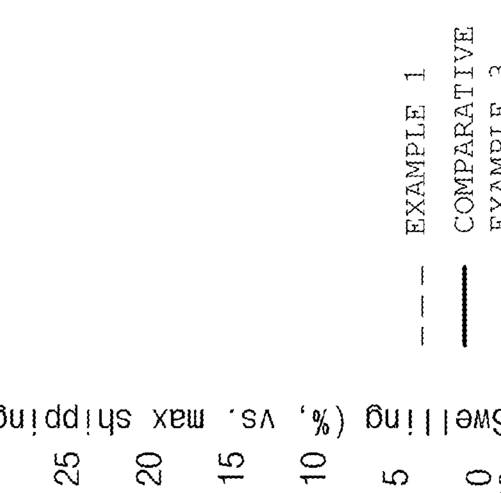
FIG. 4 is a graph comparing capacity retentions and swelling characteristics of secondary batteries prepared by Example 1 and Comparative Example 3.
Figure 4:
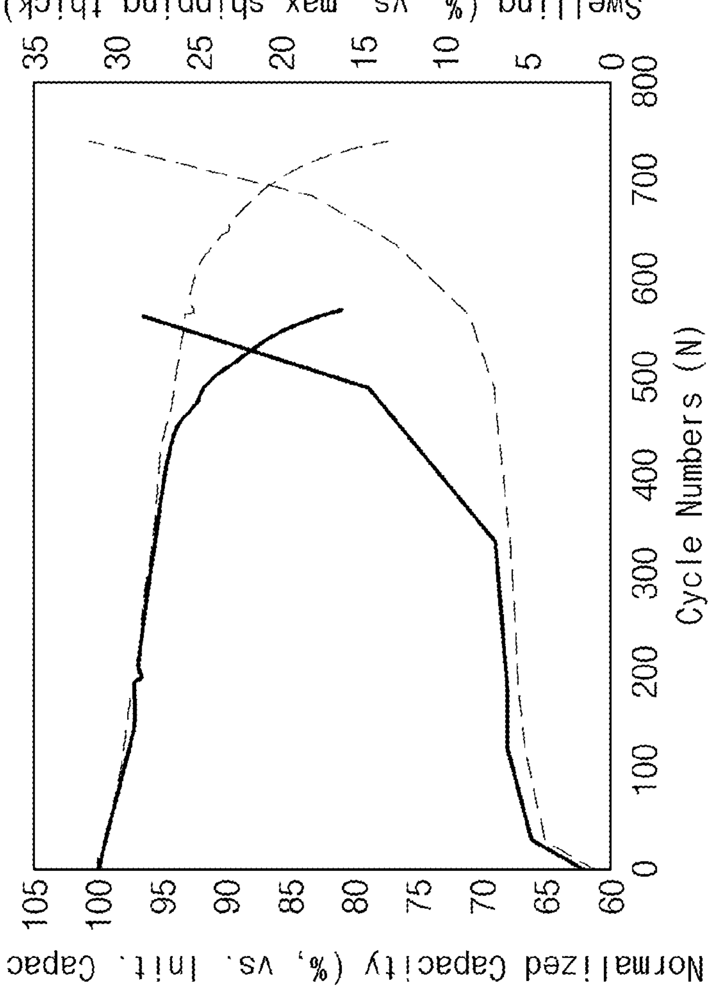
Figure 5:
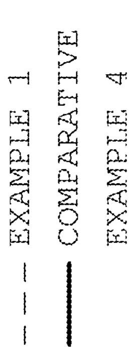
FIG. 5 is a graph comparing capacity retentions and swelling characteristics of secondary batteries prepared by Example 1 and Comparative Example 4.
Figure 5:
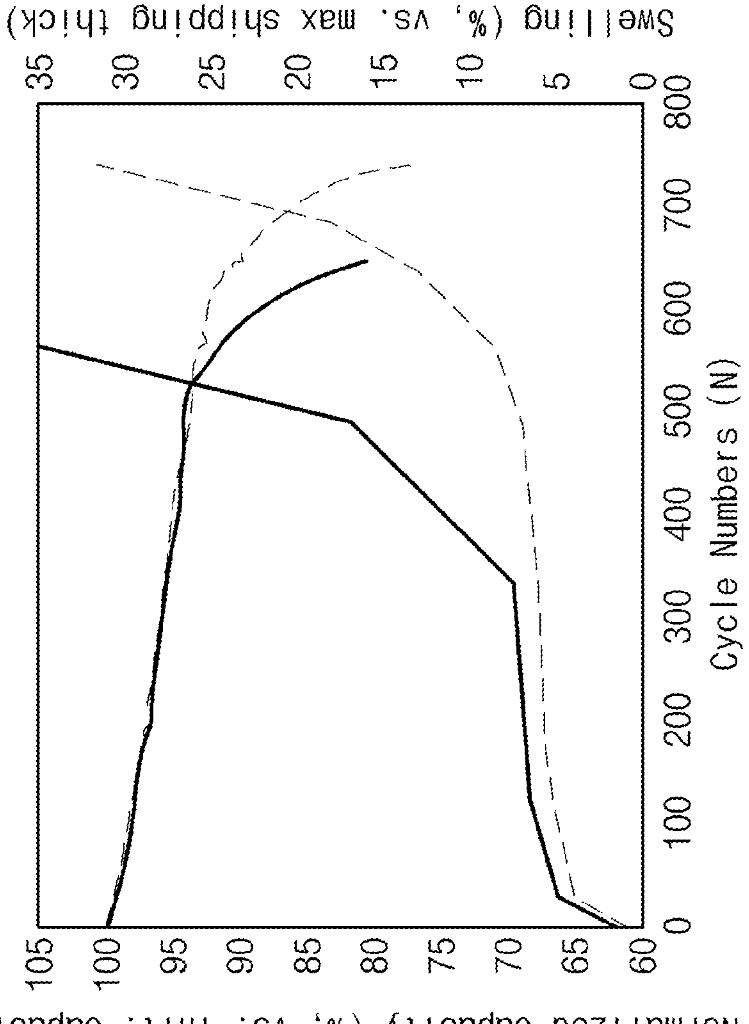

Measurement results are presented in FIGS. 3 to 5. A graph comparing capacity retentions and swelling characteristics of the secondary batteries prepared by Examples 1 to 3 and Comparative Examples 1 and 2 is illustrated in FIG. 3, and a graph comparing capacity retentions and swelling characteristics of the secondary batteries prepared by Example 1 and Comparative Example 3 is illustrated in FIG. 4. Also, a graph comparing capacity retentions and swelling characteristics of the secondary batteries prepared by Example 1 and Comparative Example 4 is illustrated in FIG. 5.

Referring to FIG. 3, with respect to the secondary batteries of Comparative Examples 1 and 2 in which the electrolyte solutions not containing propyl propionate were respectively used, it may be confirmed that cycle characteristics and swelling characteristics were significantly degraded in comparison to those of the secondary batteries of Examples 1 to 3 in which the electrolyte solutions satisfying the composition of the present disclosure were respectively used.

Also, referring to FIG. 4, in a case in which the amount of the ethylene carbonate was greater than 25 wt % even if the electrolyte including the same components was used (Comparative Example 3), it may be confirmed that cycle characteristics and swelling characteristics were significantly degraded.

Furthermore, referring to FIG. 5, in a case in which a mixture of the lithium cobalt-based oxide and the lithium nickel cobalt manganese-based oxide having a small primary particle diameter was used as the positive electrode active material even if the composition of the electrolyte solution was the same (Comparative Example 4), it may be confirmed that cycle characteristics and swelling characteristics were significantly degraded in comparison to those of a case where a mixture of the lithium cobalt-based oxide and the lithium nickel cobalt manganese-based oxide having a primary particle diameter of 3 μm or more was used (Example 1).

The invention claimed is:

1. A lithium secondary battery comprising:

a positive electrode which includes a positive electrode active material layer including a lithium nickel cobalt manganese-based oxide and a lithium cobalt-based oxide in a weight ratio of 50:50 to 80:20;

a negative electrode which includes a negative electrode active material layer including a negative electrode active material; and an electrolyte including an organic solvent and a lithium salt, wherein an average particle diameter of primary particles of the lithium nickel cobalt manganese-based oxide is 3 m or more, and the organic solvent comprises propyl propionate and a cyclic carbonate solvent containing ethylene carbonate and propylene carbonate, wherein the ethylene carbonate is included in an amount of less than 25 wt % in the organic solvent, wherein the propyl propionate is included in an amount of 65 wt % to 75 wt % in the organic solvent, and wherein the cyclic carbonate solvent includes the ethylene carbonate and the propylene carbonate in a weight ratio of 1.5:1 to 3:1.

2. The lithium secondary battery of claim 1, wherein the cyclic carbonate solvent is included in an amount of 40 wt % or less in the organic solvent.

3. The lithium secondary battery of claim 1, wherein the lithium nickel cobalt manganese-based oxide is represented by [Formula 1]:

$$Li_x[Ni_yCo_zMn_wM^1_v]O_{2-p}A_p \quad \text{[Formula 1]}$$

wherein, in [Formula 1], $M^1$ comprises at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, A comprises at least one element selected from the group consisting of F, Cl, Br, I, At, and S, and $1.0 \le x \le 1.30$, $0.3 \le y < 1$, $0 < z \le 0.6$, $0 < w \le 0.6$, $0 \le v \le 0.2$, and $0 \le p \le 0.2$.

4. The lithium secondary battery of claim 1, wherein an amount of $Ni^{2+}$ ions occupying lithium sites in the lithium nickel cobalt manganese-based oxide is 5.0 atm % or less.

5. The lithium secondary battery of claim 1, wherein the lithium nickel cobalt manganese-based oxide has a monolithic structure composed of the primary particles or is in a form of a secondary particle which is formed by aggregation of 30 or less of the primary particles.

6. The lithium secondary battery of claim 1, wherein the lithium cobalt-based oxide is represented by [Formula 2]:

$$LiCo_{1-a}M^2_aO_{2-b}B_b \quad \text{[Formula 2]}$$

wherein, in Formula 2, $M^2$ comprises at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, B comprises at least one element selected from the group consisting of F, Cl, Br, I, At, and S, and $0 \le a \le 0.2$ and $0 \le b \le 0.1$.

7. The lithium secondary battery of claim 1, wherein the positive electrode active material layer further comprises a conductive agent and a binder.

8. The lithium secondary battery of claim 7, wherein the conductive agent is included in an amount of 1.5 wt % or more based on a total weight of the positive electrode active material layer.

9. The lithium secondary battery of claim 1, wherein the negative electrode active material comprises at least one of a carbon-based negative electrode active material or a silicon-based negative electrode active material.

10. The lithium secondary battery of claim 1, wherein an operating voltage of the lithium secondary battery is 4.35 V or more.

11. The lithium secondary battery of claim 3, wherein $0.5 \le y < 1$.

12. The lithium secondary battery of claim 1, wherein the ethylene carbonate is included in an amount of less than 23 wt % in the organic solvent.

* * * * *